United States Patent [19]

Thomas

[11] Patent Number: 4,707,688

[45] Date of Patent: Nov. 17, 1987

[54] DETECTION OF TOOL BREAKS THAT CAUSE SLOWLY DECREASING CUTTING NOISE

[75] Inventor: Charles E. Thomas, Scotia, N.Y.

[73] Assignee: General Electric Company, Schenectady, N.Y.

[21] Appl. No.: 835,698

[22] Filed: Mar. 3, 1986

[51] Int. Cl.⁴ ............................................. G08B 21/00
[52] U.S. Cl. .................................. 340/680; 340/683; 73/104; 73/660
[58] Field of Search ....................... 340/680, 683, 679; 73/104, 660, 658, 593; 364/475, 507, 508, 550, 551

[56] References Cited

U.S. PATENT DOCUMENTS

| | | | |
|---|---|---|---|
| 3,793,627 | 2/1974 | Darrel et al. | 340/680 |
| 4,332,161 | 6/1982 | Kakino | 73/104 |
| 4,514,797 | 1/1985 | Begin | 364/148 |
| 4,520,674 | 6/1985 | Canada et al. | 73/660 |
| 4,636,779 | 1/1987 | Thomas et al. | 340/680 |
| 4,636,780 | 1/1987 | Thomas et al. | 340/680 |
| 4,642,617 | 2/1987 | Thomas et al. | 340/680 |

OTHER PUBLICATIONS

S. R. Hayashi et al., "Automatic Tool Touch and Breakage Detection in Turning", Sensors '85, Nov. 5–7, 1985, Detroit.

*Primary Examiner*—James L. Rowland
*Assistant Examiner*—Jeffery A. Hofsass
*Attorney, Agent, or Firm*—Donald R. Campbell; James C. Davis, Jr.; Paul R. Webb, II

[57] ABSTRACT

Vibrations at the cutting tool-workpiece interface are sensed and the accelerometer output is preprocessed to yield a cutting noise vibration signal. Digital analysis of the sampled signal is performed to detect a gradual cutting noise signal level decrease tool break signature, either continuously decreasing or decreasing in a series of small abrupt steps. A tool break alarm is generated, without false alarming on metal-to-air tool path transitions, as the mean cutting noise signal level falls below an upper check limit and, after a preset time has elapsed, crosses a lower check limit.

10 Claims, 7 Drawing Figures

PREPROCESSED CUTTING NOISE VIBRATION SIGNAL

PREPROCESSED CUTTING NOISE VIBRATION SIGNAL

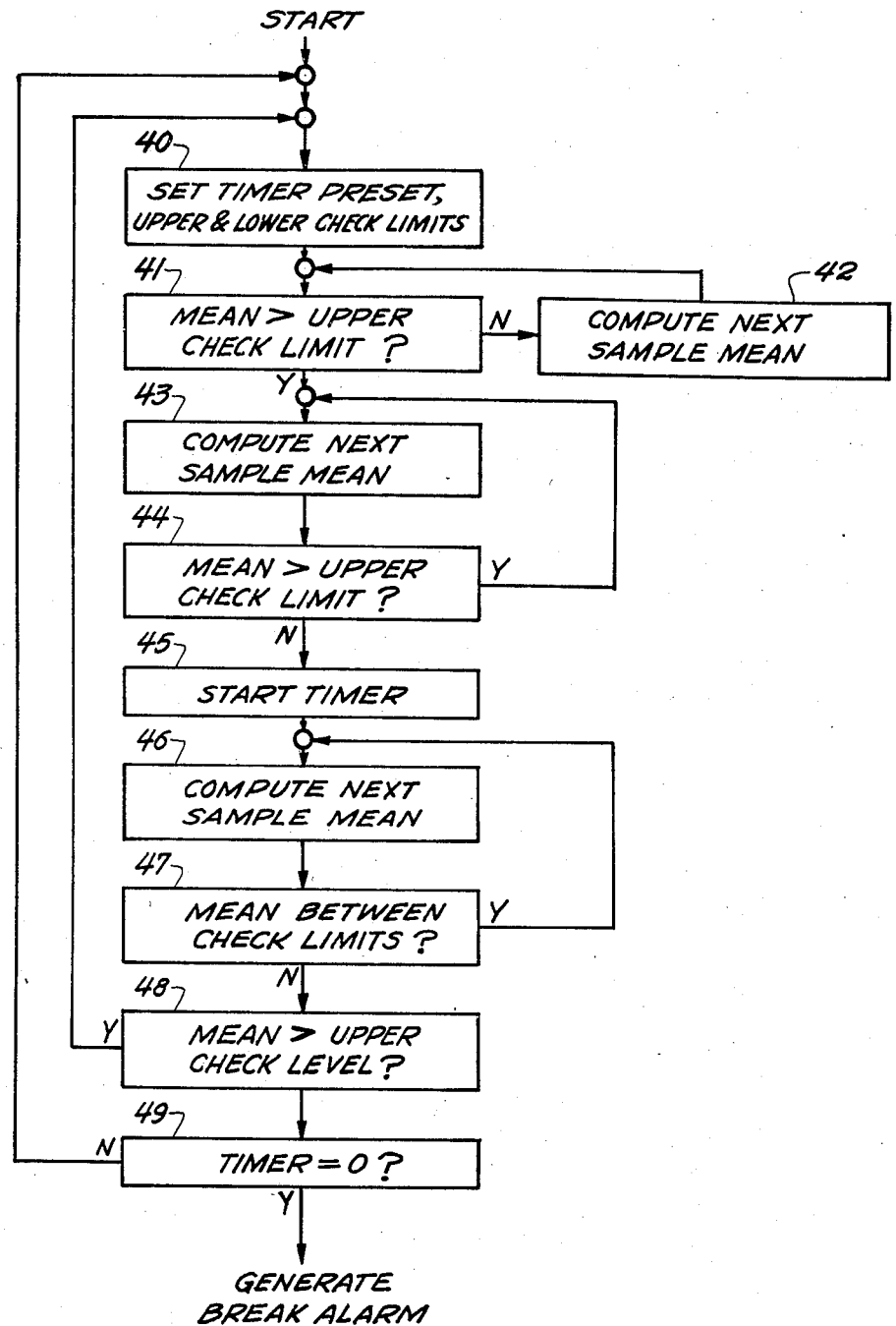

DETECTION OF TOOL BREAKS THAT CAUSE SLOWLY DECREASING CUTTING NOISE

BACKGROUND OF THE INVENTION

This invention relates to an improved system and method for acoustically detecting gradually occurring cutting tool breaks without false alarming on cuts commonly encountered in machining operations.

A tool break sensing system for lathes and other machine tools, based upon recognition of characteristic acoustic signatures in preprocessed cutting noise vibration signals, has been developed and is disclosed in several commonly assigned copending applications. The usual tool break signature is a large, abrupt, increase or decrease in signal level. Then a new type of tool break signature began occurring and a feature was added, without changing the firmware significantly, to give an alarm whenever the mean signal falls below a lower limit and remains below for at least a minimum time period. This feature permitted detection of the new gradual-decrease tool break signatures, but also caused false alarms on all ends of cut and on some other metal-to-air transitions of the tool path. These false alarms can often be ignored by the machine tool control on the basis of information in the part program as to when such metal-to-air transitions will take place. However, there are cases where this cannot be done and the gradual-decrease tool break signature recognition logic must be disabled, thus causing missed tool breaks. These types of tool breaks, that produce major cutting condition changes occurring over a period of time, are expected to remain a problem of some significance.

The foregoing break detection logic is more fully described in application Ser. No. 685,005, now U.S. Pat. No. 4,642,617, filed Dec. 21, 1984, C. E. Thomas et al, "Acoustic Tool Break Detection System and Method". The technical paper "Automatic Tool Touch and Breakage Detection in Turning", S. R. Hayashi et al, Sensors '85, Nov. 5-7, 1985, Detroit, discloses the integrated touch and break detector.

SUMMARY OF THE INVENTION

An object of this invention is to detect tool breaks whose cutting noise vibration signal signature is one of two types: a gradual continuous decrease in signal level, or a signal level that gradually decreases in a series of small abrupt level shifts.

Another object is to accomplish this tool break signature detection without producing false alarms on metal-to-air transitions of the tool path.

Yet another object is to accomplish the above within a larger system that also detects tool break signatures with abrupt signal level shifts, and to do so without retaining signal sample amplitude data for thousands of sample periods.

It has been shown that gradual signal level decrease tool break signatures do not decrease the cutting noise means vibration signal level to half its pre-break level in a period less than several seconds. This is much longer than it takes for metal-to-air tool path transitions and normal major tool fracture events to reduce the cutting noise signal level to half the pre-break level. Thus, these signal level slope differences provide a basis for rejecting signal level changes due to metal-to-air transitions while still detecting both types of gradual-decrease tool break signatures.

A machine tool monitor to detect gradually occurring cutting tool breakage is comprised of a broadband vibration sensor such as an accelerometer which generates a signal responsive to vibrations at the tool-workpiece interface. An analog preprocessor filters out lower frequences below 30 kHz to reduce interference from machine tool noise sources and detects the signal energy and outputs a cutting noise vibration signal in a frequency band below 100 kHz. A digital processor samples the processed signal and converts the samples to digital values, and calculates a mean cutting noise vibration signal. Pattern recognition logic is provided to detect the gradual signal level decrease type tool break signatures and generate a tool break alarm upon the mean cutting noise signal falling below an upper check signal level limit and, after a preset time has elapsed, crossing a lower check limit. The logic is reset to search for another downward crossing of the upper check limit if the mean cutting noise signal level exits the region between upper and lower check limits before the timer times out.

Another feature of the detection method is that an abrupt signal level shift tool break signature is detected in parallel, and the tool break alarm is generated upon detecting either the gradual-decrease or abrupt shift type of tool break signature.

BRIEF DESCRIPTION OF THE DRAWINGS

FIG. 6 is a logic flowchart for detection of gradual-decrease tool break signatures.

DETAILED DESCRIPTION OF THE INVENTION

Figure 1:
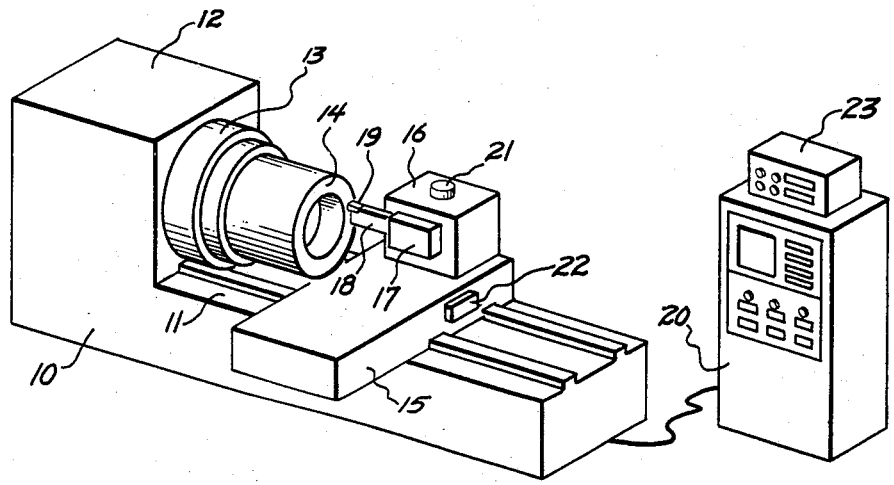
FIG. 1 is a simplified perspective view of a horizontal turret lathe on which a Machine Tool Monitor is installed.

In FIG. 1 is shown a Machine Tool Monitor installation on a horizontal turret lathe; the monitor has applicability to vertical turret lathes and other types of machine tools such as milling machines, machining centers, and drills. The illustrated lathe components are the machine frame 10, Z slide 11, headstock 12, chuck 13, workpiece 14, and X cross slide 15. A rotatable tool turret 16 has several tool blocks 17 (only one is shown) each supporting a tool holder 18 and cutting insert 19. The machine tool control 20 is also known as a numerical control or computerized numerical control. The first major component of the Machine Tool Monitor is a broadband accelerometer 21 or other vibration sensor mounted on the lathe turret or turret base in a location with good coupling to vibrations generated at the tool-workpiece interface. It is usually located on the rotatable turret and a miniature slip ring and coaxial wire connect it to the analog preprocessor 22. This second major component is preferably mounted on the lathe near the turret to minimize electronic noise pickup. The analog signal processing channel filters the raw accelerometer output to eliminate low frequency machinery noise and generates an analog waveform proportional to the amplitude of vibrations in a chosen band between 30 kHz and 100 kHz. High frequencies are ignored because they are more attenuated and distorted by propagating from the tool-workpiece interface to a remote sensor mounting location. The third major component is a digital processor 23, which includes a signal sampler and analog-to-digital converter, and uses signal pattern recognition techniques to detect tool break events on the basis of characteristic signatures.

Figure 2:
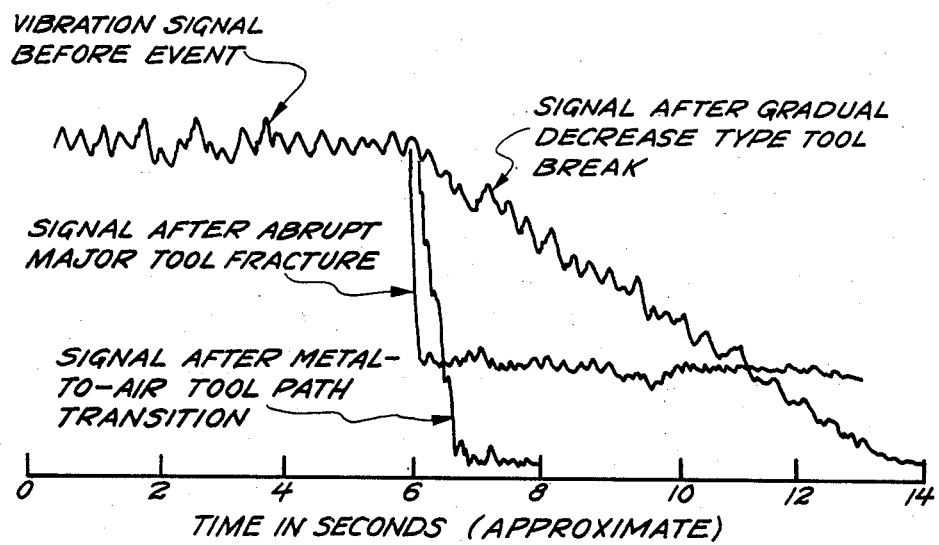
FIG. 2 shows preprocessed vibration signals and a comparison of signal level decrease rates for three types of events.
Figure 3A:
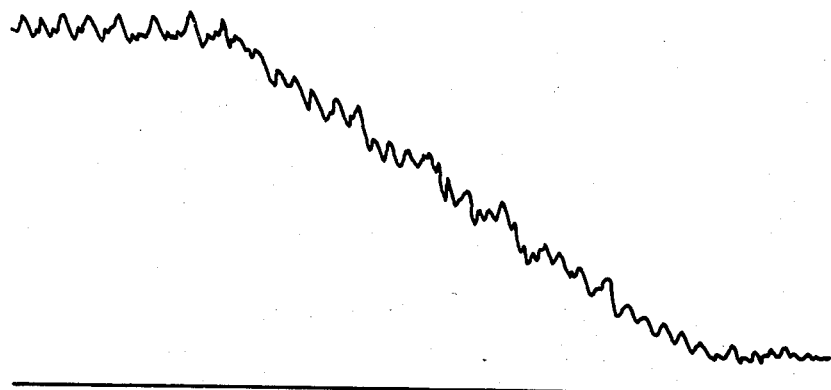
FIGS. 3a and 3b show two gradual signal level decrease acoustic signatures, a continuous type and one with a series of small abrupt steps.
Figure 3B:
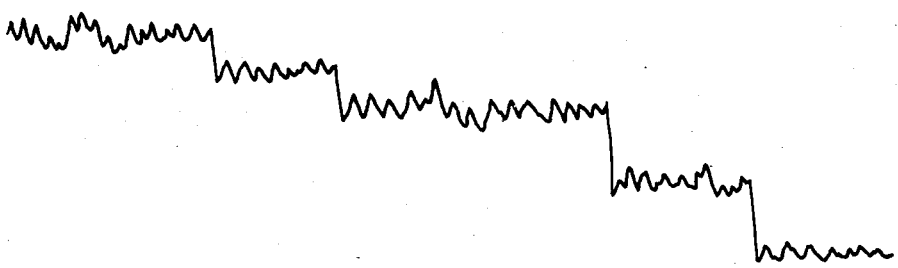

FIG. 2 shows preprocessed, mean cutting noise vibration signals; the cutting noise signal at the analog preprocessor output is sampled and digitized and a running means computed from N samples where, for instance, $N=16$. Gradual decrease tool break signatures, detected as hereafter described, have cutting noise vibration signal levels that decrease much more slowly than is the case for metal-to-air tool path transitions, and the level change rate for such transitions is, in turn, less than that of the majority of tool break signatures. FIGS. 3a and 3b illustrate the two basic sub-types of gradual-decrease tool break signatures that have been encountered. In FIG. 3a the means signal level decrease is continuous or nearly continuous. In FIG. 3b the signal level decreases in a series of widely and non-uniformly spaced small abrupt steps. Reliable detection of both these sub-types of gradual-decrease tool break signatures is required. The continuous type may result from a crumbly break and results in a gradual change in cutting conditions. The type with small abrupt steps may result from a series of small breaks, rather than one large break, resulting in small abrupt changes in cutting conditions.

Experience has shown, referring to FIG. 2, that the gradual-decrease tool break signatures do not decrease the cutting noise means vibration signal level to half the pre-break level in a period less than several seconds. Metal-to-air tool path transitions generally reduce the cutting noise signal level to half the metal-cutting level in a period of about one spindle revolution, which is generally on the order of tenths of a second. Normal major tool fracture events, such as one large break where a piece drops off and there is an abrupt and large decrease in cutting noise, generally reduce the cutting noise signal level to half the pre-break level in a period on the order of a millisecond. Thus, a basis exists in these signal level slope differences for rejecting signal level changes due to metal-to-air tool path transitions, while still detecting both sub-types of gradual-decrease tool break signatures. This is done without affecting the abrupt, large level change detection logic as currently known and described later.

Figure 4:
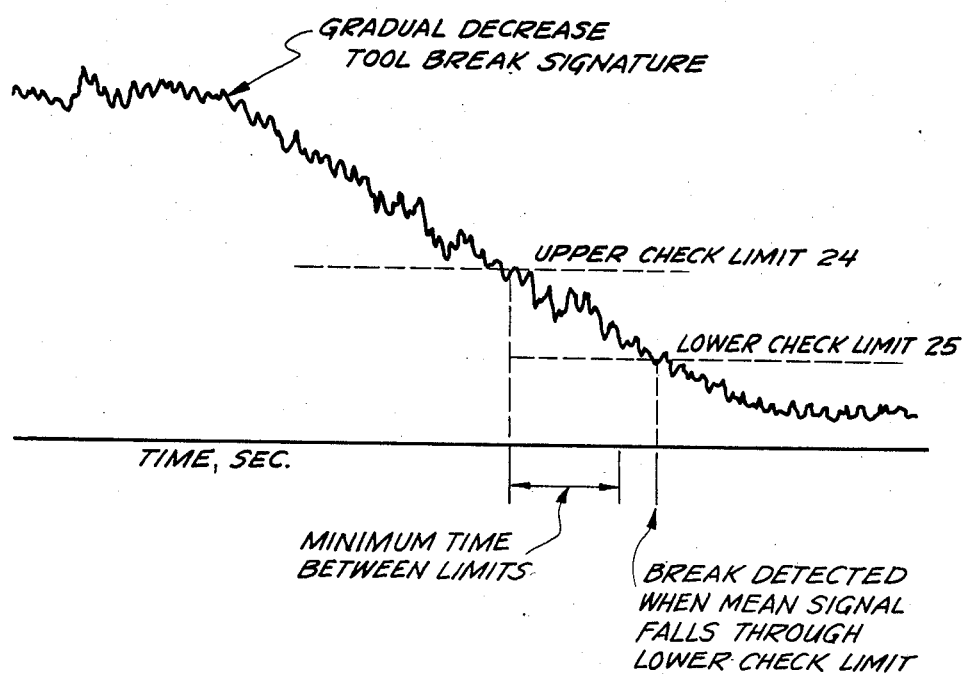
FIG. 4 illustrates detection of a gradual-decrease tool break signature.

FIG. 4 illustrates how the gradual signal level decrease pattern recognition logic detects a continuousdecrease type tool break signature. Two separate check signal level limits 24 and 25 are established. The upper check limit 24 is, for instance, set at about half the expected mean cutting noise signal level and the lower check limit 25 is set at about half the upper check level. When the signal level tracking mean falls below the upper check level 24 a timer is set. If the mean signal level goes out of the region between the two check levels in either direction before the timer times out, there is no tool break alarm and the logic is reset to look for another downward crossing of the upper check level 24. When the mean signal level crosses the upper check limit 24 and then exits the region between the two check levels by crossing the lower check limit 25 after the preset time has elapsed, a tool break alarm is generated. Operation of the gradual signal level decrease tool break logic is the same on both sub-types of such signatures. On the type with a series of small abrupt signal level decreases the time required for the means signal level to pass from the upper check limit 24 to lower check limit 25 may be considerably greater, but all that counts with either signature sub-type is that this time exceed the timer time-out period.

Figure 5:
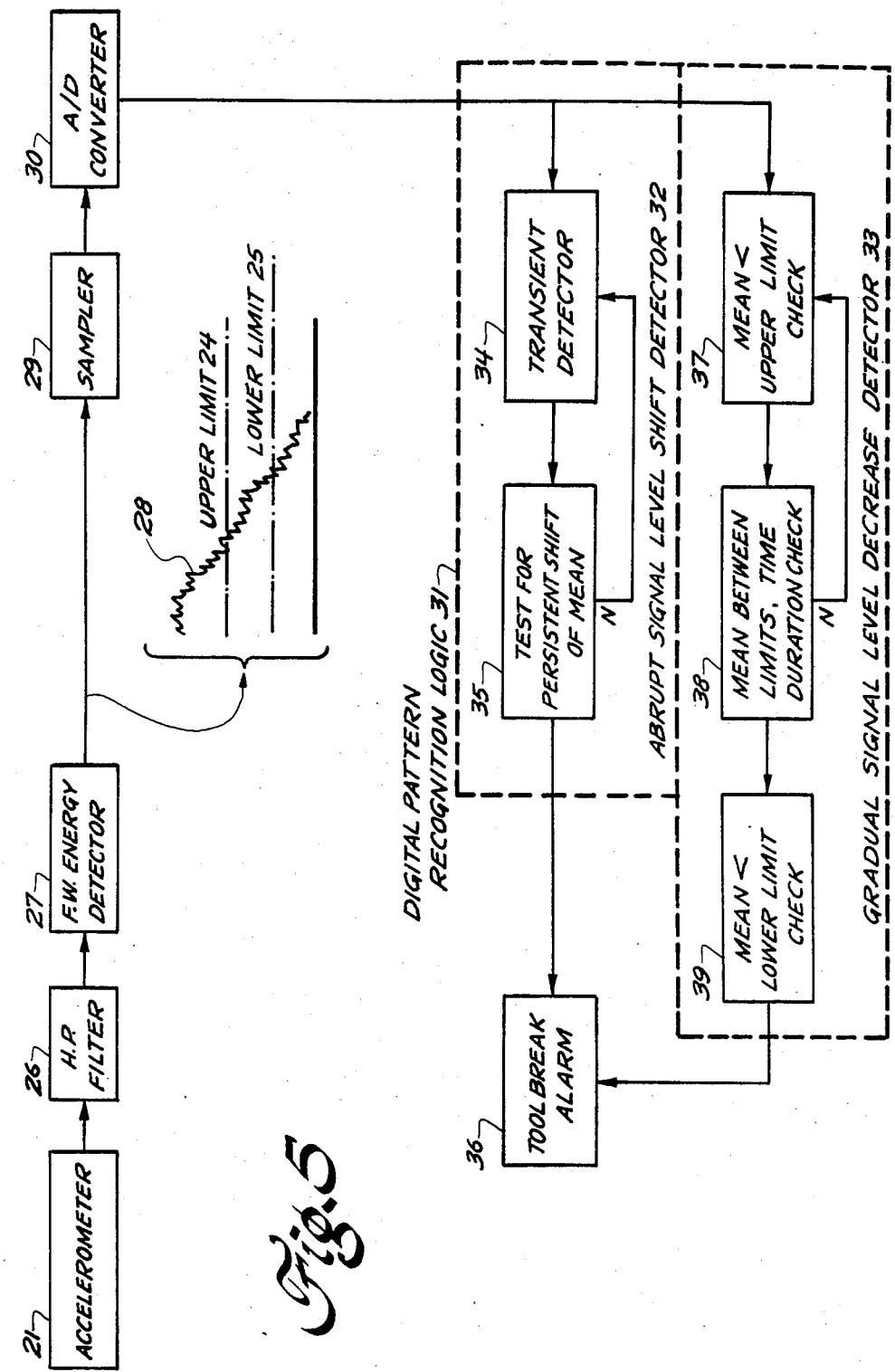
FIG. 5 is a block diagram of a tool break detection system to alarm on acoustic signatures of the abrupt level shift type or gradual level decrease type.

A complete tool break detection system which alarms on gradually occurring breaks that cause the cutting noise vibration level to slowly decrease, or on a normal break evidenced by a large, abrupt, persistent change in cutting noise, is seen in FIG. 5. Accelerometer 21 typically has a usable response from 5 Hz to 70 kHz and is preferably located on the turret of the lathe. A single accelerometer or other vibration sensor is used. The analog preprocessor is comprised of a high-pass filter 26 to filter out low frequencies below about 30 kHz to reduce interference from various machine noise sources. A full wave rectifier and lowpass filter acts as a full wave energy detector 27; the cutoff frequency of the low-pass filter is 500 Hz or less to prevent aliasing from the subsequent sampling operation as long as the sampling frequency is well above the 1 kHz Nyquist frequency. A continuously decreasing cutting noise vibration signal 28 is illustrated at the output of the analog preprocessor.

The signal samples at the output of the analog signal processing channel, extracted by sampler 29, are converted to digital values by the analog-to-digital converter 30 and the amplitude versus time traces of the samples are analyzed by digital pattern recognition logic 31. First the running mean cutting noise signal is calculated using N signal samples. The tool break detection algorithms can be implemented via microcomputer firmware. The current abrupt signal level shift detector 32 of the Machine Tool Monitor system operates in parallel with the gradual signal level decrease detector 33 so that both types of tool break signatures can be detected.

The first-mentioned detection logic analyzes the digitized signal samples in two basic phases. In the first phase, carried out in transient detector 34, an abrupt, large, increase or decrease in the mean cutting noise vibration signal level is detected, and each detection triggers the second phase, the test for mean shift persistence performed at 35. If the change in cutting noise signal level is a short transient, it is rejected in this second phase and control is returned to the first phase which resumes looking for abrupt, large changes in mean level. If the change in mean cutting noise signal level is persistent, the second phase recognizes this and generates a tool break alarm 36. Significant tool break events that cause a sustained and substantial change in cutting noise and can damage the workpiece or machine tool are detected, but there is no alarm on insignificant tool break events that do not affect cutting conditions. Refer to copending application Ser. No. 664,188, filed Oct. 24, 1984, now U.S. Pat. No. 4,636,780, C. E. Thomas et al, for a more detailed explanation.

Gradual signal level decrease detection logic 33, as shown at 37–39, is triggered by a falling of the mean cutting noise signal level below the upper check limit signal level 24. A time duration check is made and if the mean cutting noise signal exits the region between upper and lower check limits 24 and 25 before the preset time has elapsed, the logic is reset to search for another downward crossing of the upper check limit 24. As the mean cutting noise signal level crosses the lower check limit 25, after the timer has timed out, a tool break alarm 36 is generated. Fig.6 shows in more detail a high level flow chart of the gradual signal level decrease detection logic. Initial steps 40–42 are to set the timer preset and upper and lower check limits 24 and 25, and determine that the mean cutting noise signal level is in fact above the upper check limit 24. If not, the next sample mean is computed and this is repeated until the new sample mean is above the upper check limit. Steps 43 and 44 are now followed; the next sample mean is computed, a check is made that the mean is above the upper check limit 24, and this is repeated until it is established that the sample mean has fallen below the upper check limit and, at step 45, the timer is started.

The detection logic at 46 and 47 now calls for computing a next sample means and determining if that means is between check limits 24 and 25. If it is this sequence is repeated until it is found that the mean cutting noise signal level has exited the region between the two limits. At step 48 a test is made as to whether the mean signal level is above upper check level 24; if affirmative, the detection logic is reset to search for another downward crossing of the upper check limit 24 and go through steps 40–47. When at steps 48 and 49 the mean signal level is not above upper check level 24 and the timer has timed out and is zero, a tool break alarm 36 is generated. In the event the preset time has not elapsed and the timer is still running, the rate of signal level decrease has been too large and could be a metal-to-air tool path transition, and the detection logic is reset to trace back through steps 40–48.

Operation of the gradual signal level decrease tool break detection just described is the same on both subtypes of tool break signatures shown in FIGS. 3a and 3b, the continuous type and the type with a series of small abrupt steps. Metal-to-air tool path transitions do not cause a false alarm. Moreover, the gradual signal level decrease detection logic is compatible with the abrupt signal level shift detection logic and the two operate in parallel.

While the invention has been particularly shown and described with reference to a preferred embodiment, it will be understood by those skilled in the art that various changes in form and details may be made without departing from the spirit and scope of the invention.

The invention claimed is:

1. A machine tool monitor to detect gradually occurring cutting tool breakage comprising:
   a broadband vibration sensor which generates a signal corresponding to vibrations at the cutting tool-workpiece interface;
   an analog preprocessor having means to filter out lower frequency machinery noise and detect the signal energy, and output a cutting noise vibration signal in a frequency band below 100 kHz;
   a digital processor comprised of means for sampling the latter and converting samples to digital values, and for computing a mean cutting noise signal; and
   pattern recognition means to detect a gradual signal level decrease and generate a tool break alarm upon said mean cutting noise signal falling below an upper check signal level limit and, after a preset time, crossing a lower check limit.

2. The monitor of claim 1 wherein said preset time is several seconds.

3. The monitor of claim 2 wherein said upper check limit is at about half the expected average cutting noise signal level and said lower check limit is about half the upper check limit.

4. The monitor of claim 1 wherein said pattern recognition means is reset to search for another downward crossing of said upper check limit in response to said mean cutting noise signal exiting the region between said upper and lower limits in either direction before said preset time has elapsed.

5. The monitor of claim 4 wherein said pattern recognition means includes a timer that is started as said mean signal falls below said upper check limit and is reset by the mean signal exiting before said timer is zero.

6. The monitor of claim 1 wherein said vibration sensor is an accelerometer and said analog preprocessor filters out machinery noise below 30 kHz and is further comprised of a full wave rectifier and low pass antialiasing filter serving as the energy detector.

7. The method of acoustically detecting cutting tool breaks comprising the steps of:
   sensing vibrations at the tool-workpiece interface during a machining operation and generating an electrical signal;
   preprocessing said vibration signal to filter out low frequencies to reduce interference from machine tool noise sources and to detect the signal energy in a frequency band between 30 kHz and 100 kHz;
   sampling the preprocessed signal, converting samples to digitized values, and computing mean cutting noise signal samples; and
   detecting a gradual signal level decrease tool break signature by logic which analyzes the amplitude of said mean samples, performs a time duration check when the mean cutting noise signal level falls below an upper signal level check limit, and generates a tool break alarm only if the mean signal level crosses a lower check limit after a preset time has elapsed.

8. The method of claim 7 further comprising the step of resetting the logic and searching for another downward crossing of said upper check limit in response to exiting the region between said upper and lower check limits in either direction before elapse of said preset time.

9. The method of claim 8 wherein said upper check limit is about half the expected average cutting noise signal level and said lower check limit is about half the upper check limit.

10. The method of claim 7 further comprising the step of detecting, in parallel, an abrupt signal level shift tool break signature and generating the tool break alarm upon detecting either type of tool break.

* * * * *